Figure 1:
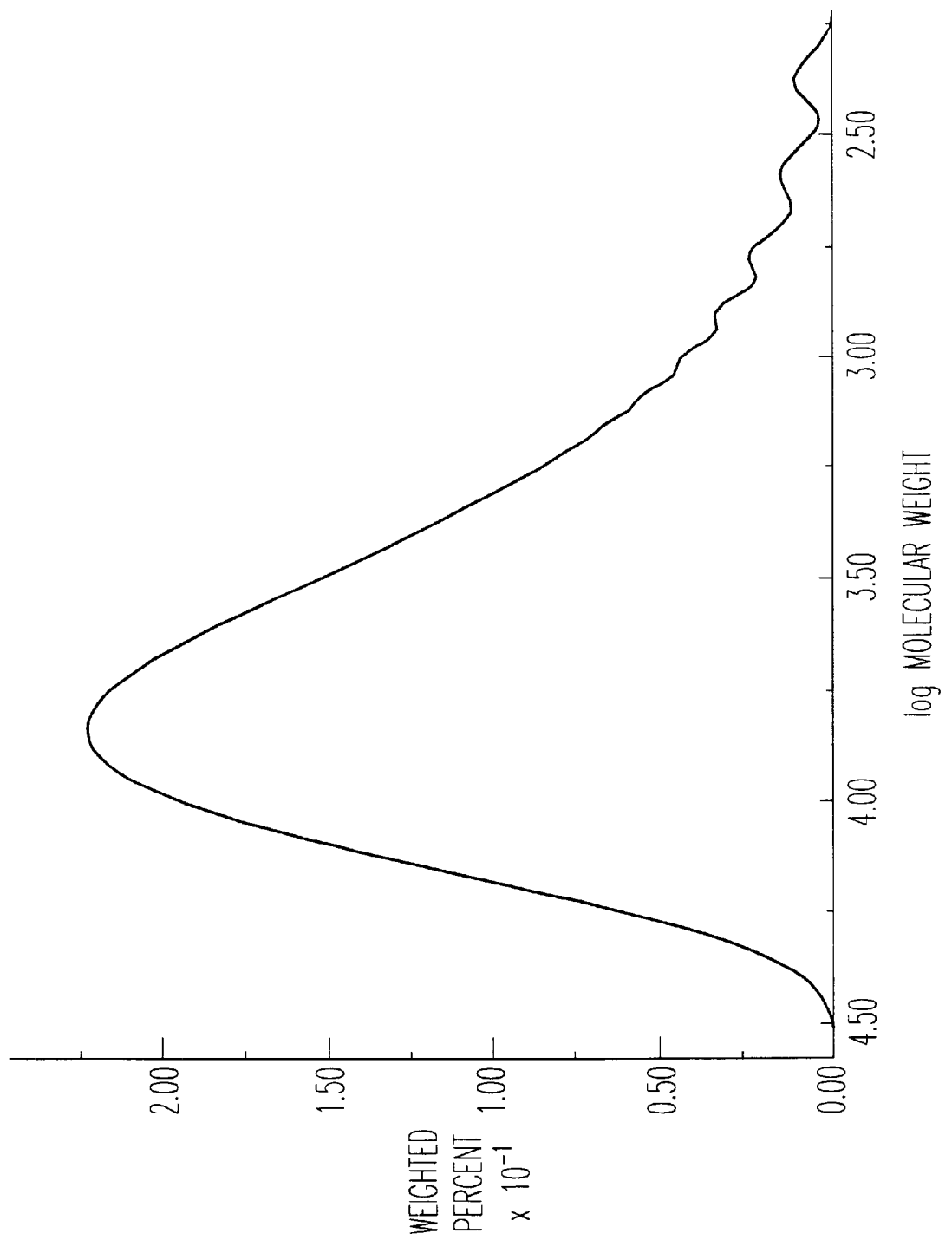

United States Patent

Greco

[11] Patent Number: 5,929,193
[45] Date of Patent: Jul. 27, 1999

[54] PROCESS FOR PREPARATION OF POLYCARBONATE COPOLYESTER DIOLS

[75] Inventor: Alberto Greco, Dresano, Italy

[73] Assignee: Enichem S.p.A., Milan, Italy

[21] Appl. No.: 08/974,917

[22] Filed: Nov. 20, 1997

[30] Foreign Application Priority Data

Dec. 19, 1996 [IT] Italy .................................. MI96A2662

[51] Int. Cl.⁶ .................................................. C08G 63/00
[52] U.S. Cl. ........................................... 528/196; 528/176
[58] Field of Search ...................... 528/176, 196

[56] References Cited

U.S. PATENT DOCUMENTS

| | | | |
|---|---|---|---|
| 4,816,529 | 3/1989 | Harris | 525/453 |
| 4,990,578 | 2/1991 | Greco et al. | 523/456 |
| 5,116,929 | 5/1992 | Greco et al. | 528/44 |
| 5,288,839 | 2/1994 | Greco | 528/204 |

FOREIGN PATENT DOCUMENTS 1 955 902  5/1971  Germany .

*Primary Examiner*—Terressa Mosley
*Attorney, Agent, or Firm*—Oblon, Spivak, McClelland, Maier & Neustadt, P.C.

[57] ABSTRACT

The invention describes a process for the preparation of polycarbonate copolyester diols with a molecular weight ranging between 1000 and 6000 units having the following general formula:

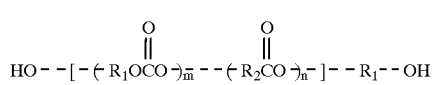

(I)

wherein the polycarbonate or polyether polycarbonate diol units

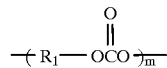

represent a proportion of between 30 and 70% by weight of the whole polycarbonate or polyether carbonate co-polyester diol $R_1$ is a divalent organic radical deriving from one or more polyetherglycols or aliphatic glycols containing from 4 to 20 carbon atoms;

$R_2$ is a divalent organic radical corresponding to a cyclic lactone having a ring with 4, 6, 7 atoms or an organic residue deriving from a lactide or glycolide;

n and m, the same or different, can have any value between 2 and 40;

said process being characterized in that cyclic esters having the formula:

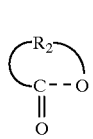

(II)

wherein $R_2$ has the meaning defined above, are reacted with polycarbonate or polyethercarbonate diols having the formula:

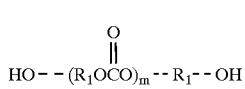

(III)

wherein $R_1$ and m have meaning defined above, at a temperature RANGING between 100° and 180° C. and for a time between 2 and 10 hours.

13 Claims, 5 Drawing Sheets

PROCESS FOR PREPARATION OF POLYCARBONATE COPOLYESTER DIOLS

The present invention relates to a process for the preparation of polycarbonate co-polyesterdiols.

More specifically, it relates to a process for the preparation of polycarbonate and polyether carbonate co-polyesterdiols which consists in reacting cyclic esters with polycarbonate and polyethercarbonate diols under particular operating conditions.

The invention also relates to the polycarbonate and polyethercarbonate co-polyesterdiols obtained with the above process.

The polycarbonate and polyethercarbonate copolyester diols of the present invention are characterized in that they are liquid with low viscosity at room temperature, they have a low glass transition temperature and can be usefully applied in the manufacturing of polyurethane end-products, thermoelastomers, paints and adhesives.

A variety of syntheses for the preparation of polycarbonate copolyesters are known in the art.

For example, polyester polyols can be obtained by the alcoholysis of cyclic lactones, as described in the article of Robson F. Storey (JMS, Pure Appl. Chem., 4 33 (1), 77, 1996). In the alcoholysis reaction ε-caprolactone is added to a diol such as, for example, ethylene glycol, butandiol etc., to give oligomeric polyesters containing the glycol used as initiator in their structure. The yields of this reaction however are not quantitative and, in addition, high quantities of catalyst are used. According to the article, the conversion of ε-caprolactone is 84% operating in the presence of 0.4% by weight of an optimum catalyst such as stannous octoate.

Robert F. Harris (J. Appl. Polym. Sc. 44, 605 1992) discloses that polyether polycarbonate co-polyester diols can be obtained by modifying polyether polycarbonate diols with polyesters, at a temperature of 175° C. and in the presence of sodium stannate as catalyst at 0.5% by weight of the reagents.

The process described by Harris has the disadvantage of using relatively high levels of catalyst which make it difficult to purify the end product from the catalytic residues, a necessary requisite for the application of the polyol in the synthesis of polyurethanes.

In addition, the "molecular weight advancement" method used for controlling the molecular weight of the polyol has the disadvantage of requiring high process temperatures, >175° C., to eliminate under conditions of high vacuum the most volatile glycol from the reaction environment by distillation.

U.S. Pat. No. 4,816,529 describes the preparation of polyether polycarbonate copolyester diols by the copolymerization of polyester diol (polycaprolactone diol) and ethylene carbonate in the presence of sodium stannate as catalyst; the molecular weight of the polyol is controlled by the "Molecular weight Advancement" process. As an alternative to ethylene carbonate, ethyleneoxide and carbon dioxide can be used. The process does not eliminate however the above drawbacks due to the use of the "molecular weight advancement" process and also uses reagents which are relatively costly (ethylene carbonate) or difficult to handle (ethylene oxide and carbon dioxide) which require medium or high process pressures (from 20 to 80 Kg/cm²).

U.S. Pat. No. 3,301,824 describes polyether polycarbonate copolyester diols obtained by anionic copolymerization, by grafting on a diol used as initiator, cyclic esters (lactones), in particular caprolactone, and cyclic carbonates with a wide ring such as that which can be obtained from diethyleneglycol (Ger.offen. 3.103.135) or from hexan 1,6 diol (Ger.offen. 3.103.137); the two cyclic carbonates with a wide ring are synthesized however with non-quantitative yields and the process conditions for isolating them in their pure state are difficult to embody.

J.P. Pat 61115.925 (CA 106.85679) describes polycarbonate co-polyester diols obtained by the direct transesterification of hexanediol and cyclic lactones, in particular ε-caprolactone by dialkylcarbonates in the presence of transesterification catalysts; the process requires rather high temperatures and the molecular weight control can be obtained by "Molecular weight Advancement" which has the disadvantages mentioned above; as well as this, owing to the high process temperature (170–200° C.), the reaction is less generally applicable, as some lactones, lactides and glycolides are sensitive, in this temperature range, to thermal depolymerization.

The applicant has now found that polycarbonate and polyethercarbonate copolyester diols can be directly obtained by the addition of polyether carbonate diols or polycarbonate diols to cyclic esters, more or less quantitatively, in reasonably short times and within a relatively moderate temperature range.

In addition the reaction does not require other catalysts apart from those used for the synthesis of the poycarbonate or polyether carbonate diols.

More specifically, the present invention relates to a process for the preparation of polycarbonate and polycarbonate copolyester diols with a number average molecular weight ranging between 1000 and 6000 units having the following general formula:

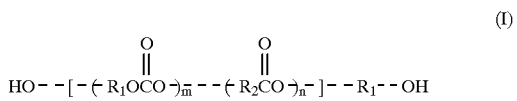

wherein the polycarbonate or polyethercarbonate diol unit

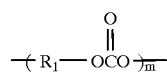

represents a proportion of between 30 and 70% by weight;

$R_1$ is a bivalent organic radical deriving from one or more polyetherglycols or aliphatic glycols containing from 4 to 20 carbon atoms;

$R_2$ is a bivalent organic radical corresponding to a cyclic lactone having a ring with 4,6,7 atoms or an organic residue deriving from a lactide or glycolide;

n and m, the same or different, can have any value between 2 and 40;

said process being characterized in that cyclic esters having the formula:

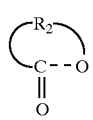

wherein $R_2$ has the meaning defined above, are reacted with polyethercarbonate or polycarbonate diols having the formula:

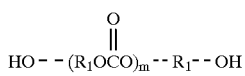

(III)

wherein $R_1$ and m have the meaning defined above, at a temperature of between 100° and 180° C. and for a time between 2 and 10 hours.

When two or more units deriving from aliphatic glycols or polyetherglycols enter to form part of structure I, $R_1$ represents the radical of a glycol whose molecular weight comes from the weight average of the organic radicals of the glycols which it represents.

In particular $R_1$ can be one or more of one of the following radicals or normally represents two or more of these:

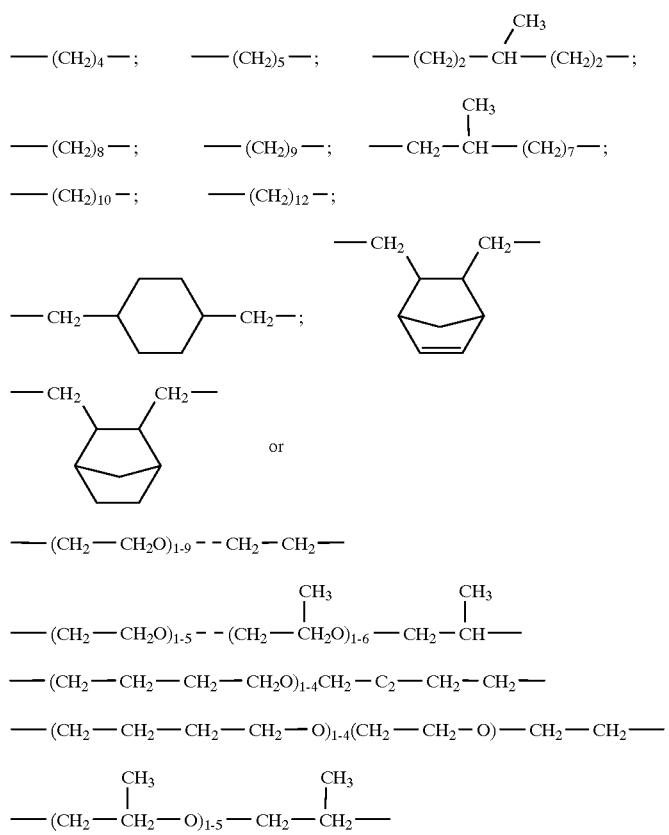

$R_2$, in particular, can consist of the following divalent organic radicals:

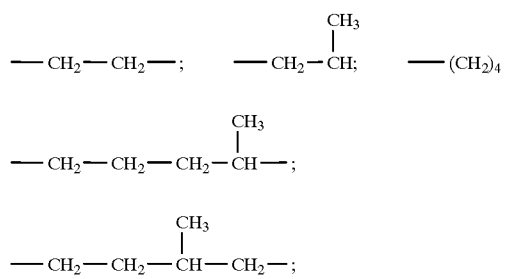

-continued

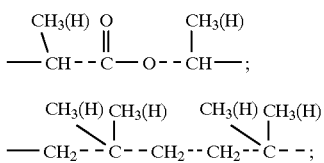

The products having structure I are obtained by adding the compounds having structure II to those having structure III at the process temperature which is preferably maintained within the range of 120° to 170° C.

As the addition reaction of II to III is exothermic the process temperature must be kept under control and the addition graduated over a time of 1–4 hours.

At the end of the addition the process temperature can be raised by 10°–40° C. remaining however within the range indicated to complete the reaction, which requires from 2 to 8 hours.

The conversion of II is generally higher than 95% and in the most favourable cases complete, as in the case when II is ε-caprolactone.

To eliminate the possible presence of II in the case of incomplete conversion (conversion of 95–99%), II can be removed at 110–120° C. under vacuum at 0.02 mm Hg until the level of II in I is less than 0.2%.

The reaction is practically quantitative and is carried out without catalysts apart from those used for the synthesis of the polyether polycarbonate diols.

Optionally, to accelerate the reaction times, catalysts can be used on the reagents, up to a level of 50 ppm and preferably 20 ppm, selected from the group of organometallic compounds or from tertiary amines with pKb>12, and preferably from a combination of the two groups.

Among the organometallic compounds, compounds deriving from di and tetravalent tin are preferred; among the amines, cyclic amines are preferred.

Among the compounds of tin, tin dibutyldilaurate, tin octoate are particularly suitable, among the amines, 1,4-diazabicyclo [2-2-2]octane, 1,5,7 triazabicyclo [4-4-0]dec 5-ene and its N methylderivative, 1,5 diazabicyclo[4,3,0] non5ene and 1,8 diazabicyclo [5,4,0]undec7ene, can be mentioned.

Optionally, other additives can also be added to remove traces of free acidity possibly present in the lactones (lactides, glycolides) such as epoxides, carboimides up to a maximum level of 0.2%.

For this purpose, an epoxide, preferably glycidol, is added at a maximum level of 0.1%.

Other additives include antioxidants and process stabilizers, among these those of the group of sterically hindered phenols and phosphites can be mentioned; their total content is 0.1% maximum and preferably 100 ppm.

predetermine, on the basis of the stoichiometric values, the molecular weight of the polyol without resorting to complex processing operations in the process phase, such as extraction under vacuum of the volatile glycols required in the process using "molecular weight advancement" mentioned above; in addition it has the advantage of diluting the catalytic residues present in the (polyether) polycarbonate diol onto which the lactone (lactide) is grafted, so that polycarbonate and polyethercarbonate copolyester diols containing quantities of catalytic residues <10 ppm can be obtained, these qualities being particularly appreciated for the use for which they are destined.

The structures having formula I* provided hereunder, have particular advantages when they are used in polyurethane end-products. In this case, in fact, the low tg values of the caprolactone diol and the high thermal resistance are combined with the greater hydrolytic resistance and high resistance to oil absorption of the polyether polycarbonate.

(I*)

$$HO-[C-C-O-C-C-OCO-CCCCC-CO]_{m\text{-}n\text{-}1}-CCOCCOH$$

Polycarbonate and polyethercarbonate diols having formula III suitable for the synthesis of products having formula I can be prepared by the transesterification of dimethyl carbonate with polyether glycols or glycols deriving from $R_1$, in the presence of a catalyst consisting of a titanium salt or an oxide, hydroxide or a carbonate of alkaline or earth alkaline metals.

In fact, although polycarbonate and polyethercarbonate diols having formula I can be obtained with a variety of synthetic methods (from phosgene or by transesterification with dialkyl, diallyl, diaryl and alkylene carbonates) those obtained with the method described above have the advantage of a low level of catalytic residues (<20 ppm of transition metals) and at the same time of having sufficient reactivity to enable them to be advantageously applied in the preparation of polyether polycarbonate copolyesters having structure (I).

Among the compounds having formula (II), ε-caprolactone is widely preferred; when this cyclic ester is used, the yield to (I) is quantitative and there is therefore no need to remove the non-reacted monomer from the reaction environment.

When $R_1$ is a divalent organic radical corresponding to

—(CH$_2$)$_4$—; —(CH$_2$)$_5$—; —(CH$_2$)$_6$—; —CH$_2$—CH$_2$—O—CH$_2$—CH$_2$—;

or their mixtures and n=m and $R_2$=—(CH$_2$)$_5$—, i.e. it is the organic radical corresponding to ε-caprolactone, it is possible to have real eutectics with extremely interesting characteristics, making them particularly suitable for use in the synthesis of polyurethanes; these characteristics are represented by the fluid state at room temperature, particularly low viscosity and minimum values of the glass transition temperature (tg), lower than those of pure polycarbonate and polyethercarbonate diols and of poly ε-caprolactone itself which is solid at room temperature.

From a synthetic point of view, the grafting reaction of cyclic lactones (lactides, glycolides) onto (polyether) polycarbonate diols has the advantage of being able to Lower tg values of the polyols are generally associated with a better flexibility at low temperatures, this is particularly true in the case of the structures:

$$HO\text{-}[\text{-}R'_1\text{-}O\text{-}CO\text{-}\text{-}CCCCC\text{-}CO\text{-}]_{\overline{m}}R_1\text{-}OH$$

Wherein $R'_1$ can be:

—(CH$_2$)$_4$—; —(CH$_2$)$_5$—; —(CH$_2$)$_6$— and m has the values previously defined.

The above structures also combine a hydrolytically stable structure such as that of alkylene polycarbonate with that of the polycaprolactone allowing a better resistance to hydrolytic aging in the polyurethane structures into which Ib is introduced.

The following examples provide a better illustration of the invention.

DESCRIPTION OF MATERIALS USED IN EXAMPLES 1–7

DEGCD: polyether polycarbonate diol Mn 1028, N°$_{OH}$ 109.14, Mn 1028 obtained from diethyleneglycol (DEG: 2.2 Kg) and dimethylcarbonate (DMC: 2 Kg) in the presence of titanium tetraisopropylate (0.17), at a temperature of 175° C.

The diethyleneglycol is distilled so as to have DEGCD with a molecular weight of about 1050.

BDCD: polycarbonate diol obtained from butandiol 1,4 (BD) and DMC under the conditions described in DEGCD.

N°$_{OH}$ 112.13, Mn 1001

HDCD: Polycarbonate diol obtained from hexandiol 1,6 and DMC under the conditions described in DEGCD.

N°$_{OH}$ 96.2, Mn 1147

RAVECARB[R] 102 and 106: polycarbonate diols obtained from hexandiol 1,6 and DMC—product sold by ENICHEM.

$N°_{OH}$ 112.2 (±5%) and 56.1 (±5%)

TPG(70)DEG(30) CD: obtained from polycarbonate diol from DEG (30 parts by weight) and tripropyleneglycol (TPG) (70 parts by weight) and DMC, under the conditions described in DEGCD.

$N°_{OH}$ 88.14, Mn 1273.

CL: ε-caprolactone
VL: valerolactone
L Lact: l-lactide (3,5 cis 3,6 dimethyl dioxan 2,5 dione)
SnDBL: Tin n-butyldilaurate
TABD: 1,5,7 triazabicyclo [4,4,0] dec 5 ene
GLY: glycidol
BD: Butan 1,4 diol
MDI: Diphenylmethane diisocyanate
Characterization of the polyols
DSC: tg (glass transition temperature);
mp (melting point)
GPC: THF solution, Stiragel columns
Characterization of the thermoelastomeric polyurethanes (TPU): methods.
Oil absorption: ASTM D 896
Tensile properties: " D 638

EXAMPLE 1

Preparation of Diethyleneglycolpolycarbonate Copolycaprolactone Diol Mn 2000 (Ia)

Freshly prepared DEG CD (see legenda) containing 13 ppm of titanium as catalytic residue (g 500) in an atmosphere of dry nitrogen and 0.15 g of glycidol are charged into a four-necked 1.5 l, glass flask equipped with a feeding funnel, mechanical blade stirrer, thermometer for the temperature control, connected to a Liebig cooler with a collection flask.

The internal temperature of the flask is brought to 150° C. by means of an external oil bath; CL (g. 490.7) is fed under stirring through a drip funnel over a period of an hour, the temperature being maintained at +150° C.

When the feeding of the CL is complete, the internal temperature in the flask is raised to 170° C.

The reaction is left to proceed for three hours.

The temperature of the flask is lowered to 120° C. and a vacuum (0.2 mm Hg) is applied by means of a mechanical pump, occasionally introducing a small stream of nitrogen from the bottom of the flask using a capillary tube.

Under these conditions it is not possible to distill any product from the bottom of the flask which is therefore discharged from the polyether polycarbonate copolyester diol represented by the structure Ia:

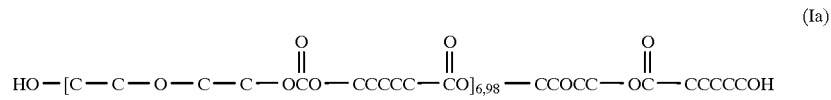

(Ia)

with the following characteristics:

| | |
|---|---|
| physical state | liquid |
| colour | pale yellow |
| $N°_{OH}$ (mg KOH/g) | 57.52 |
| $N°_{acid}$ (mg KOH/g) | 0.052 |
| viscosity Cps, | |
| +25° C. | 20900 |
| +50° C. | 3370 |
| +75° C. | 980 |
| pH | 6.05 |
| tg (DSC; C.°) | −50 |
| density (g/ml) | 1.154 |
| solubility in water (wt %) | 0.1 |
| ε-caprolactone (vpc) (wt %) | 0.05 |
| gpc (FIG. 1): | |
| Mn | 2854 |
| Mw | 6274 |
| Mw/Mn | 2.20 |

EXAMPLE 2

Preparation of Polybutylene Polycarbonate Copolycaprolactone Diol Mn 2000 (Ib)

The reaction of example 1 was repeated starting from BDCD freshly prepared by the transesterification of BD with dimethylcarbonate (DMC) and containing 10 ppm of titanium as catalytic residue (g 450) and ε Cl (g 453).

No distillable material is recovered by stripping under vacuum and the yield to Ib should therefore be considered as being quantitative.

Ib normally corresponds to the structure:

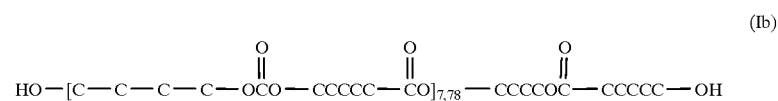

(Ib)

and has the following characteristics:

| | |
|---|---|
| physical state | liquid |
| colour (APHA) | 50 |
| $N°_{OH}$ (mg KOH/g) | 56.3 |
| $N°_{acid}$ (mg KOH/g) | 0.07 |
| viscosity Cps, +25° C. | 20700 |
| pH | 6.5 |
| tg (DSC; C.°) | −59.3 |

-continued

Figure 2:
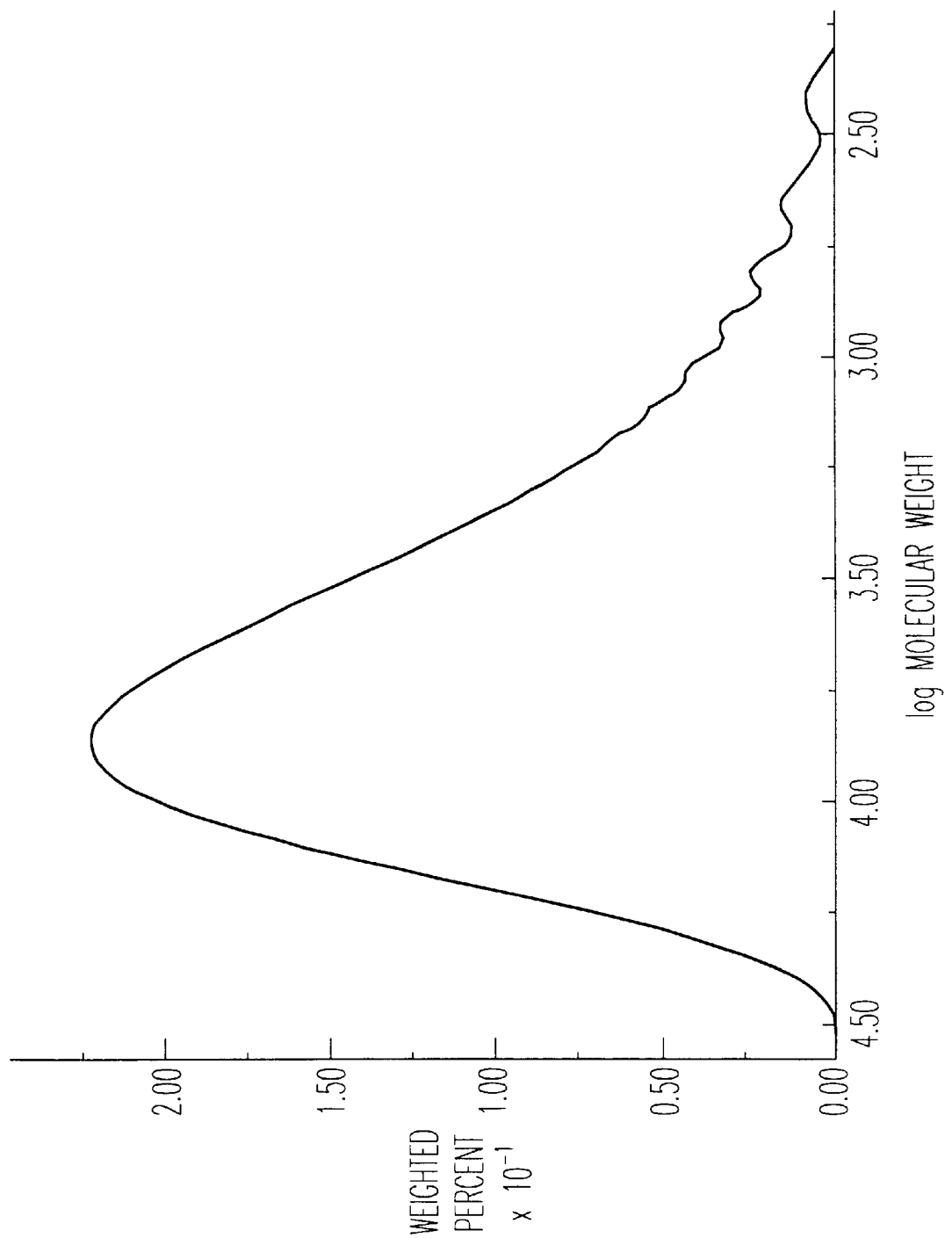

| | |
|---|---|
| density (g/ml) | 1.125 |
| solubility in water (wt %) | 0.4 |
| ε-caprolactone (vpc) (wt %) | 0.07 |
| gpc (FIG. 2): | |
| Mn | 2910 |
| Mw | 6530 |
| Mw/Mn | 2.24 |

EXAMPLE 3

Preparation of Polyhexamethyleneglycol Polycarbonate Co ε-polycaprolactone Diol Mn 2000 (Ic)

HDCD freshly prepared from hexandiol 1,6 and dimethylcarbonate and containing 12.5 ppm of titanium as catalytic residues (g 500) is reacted with CL (g 400) under the conditions of example 1.

No volatile material can be stripped under the distillation conditions defined in example 1; the yield to Ib corresponding to the structure:

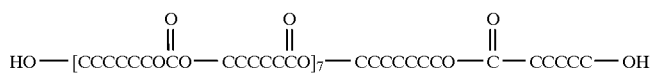

can therefore be considered as quantitative.
Ic has the following characteristics:

| | |
|---|---|
| physical state | liquid |
| colour (APHA) | 50 |
| N°$_{OH}$ (mg KOH/g) | 54.85 |
| N°$_{acid}$ (mg KOH/g) | 0.059 |
| viscosity Cps, | |
| +25° C. | 17000 |
| +50° C. | 3700 |
| +75° C. | 1100 |
| tg (DSC; C.°) | −64.6 |
| density (g/ml) | 1.12 |
| free ε-caprolactone (wt %) | 0.05 |

EXAMPLE 4

Preparation of Polyhexamethyleneglcyolpolycarbonate Co ε-caprolactone Diol (Ic*) from Hexamethylene Polycarbonate Diols of a Commercial Origin (RAVECARB$^R$)

RAVECARB 106 (g 63.6) and RAVECARB 102 (g 436.4) of Enichem are accurately mixed in the reactor described in example 1 for two hours at 150° C.

Glycidol (g 0.15), SNDBL (7.5 mg in 0.3 ml of MEK) and TABDE (7.5 mg in 0.3 ml of MEK) are then introduced into the reactor.

ε CL is added over a period of an hour at 150° C. as described in example 1.

The reaction is continued for 8 hours at the end of which it is not possible to strip any volatile product from the reactor applying the conditions described in example 1. The yield to Ic* is therefore considered quantitative.

The basicity due to the TABDE was blocked by the addition of p.chlorobenzoylchloride (mg 15 in 0.3 ml of MEK).

Ic* has the following characteristics:

| | |
|---|---|
| N°$_{OH}$ (mg KOH/g) | 56.2 |
| N°$_{acid}$ (mg KOH/g) | 0.1 | and the other characteristics similar to those of Ic.

EXAMPLE 5

Preparation of Tripropyleneglycol Diethyleneglycol Co Polycarbonate Co Polycaprolactone Diol (Id)

Freshly prepared TPG (70) DEG (30) CD containing 7 ppm of potassium (as KOH) as catalytic residue (g 450) and glycidol (0.1 g) is reacted with ε-Cl (g 274) under the conditions described in example 1, but completing the reaction in a total time of 6 hours.

Figure 3:
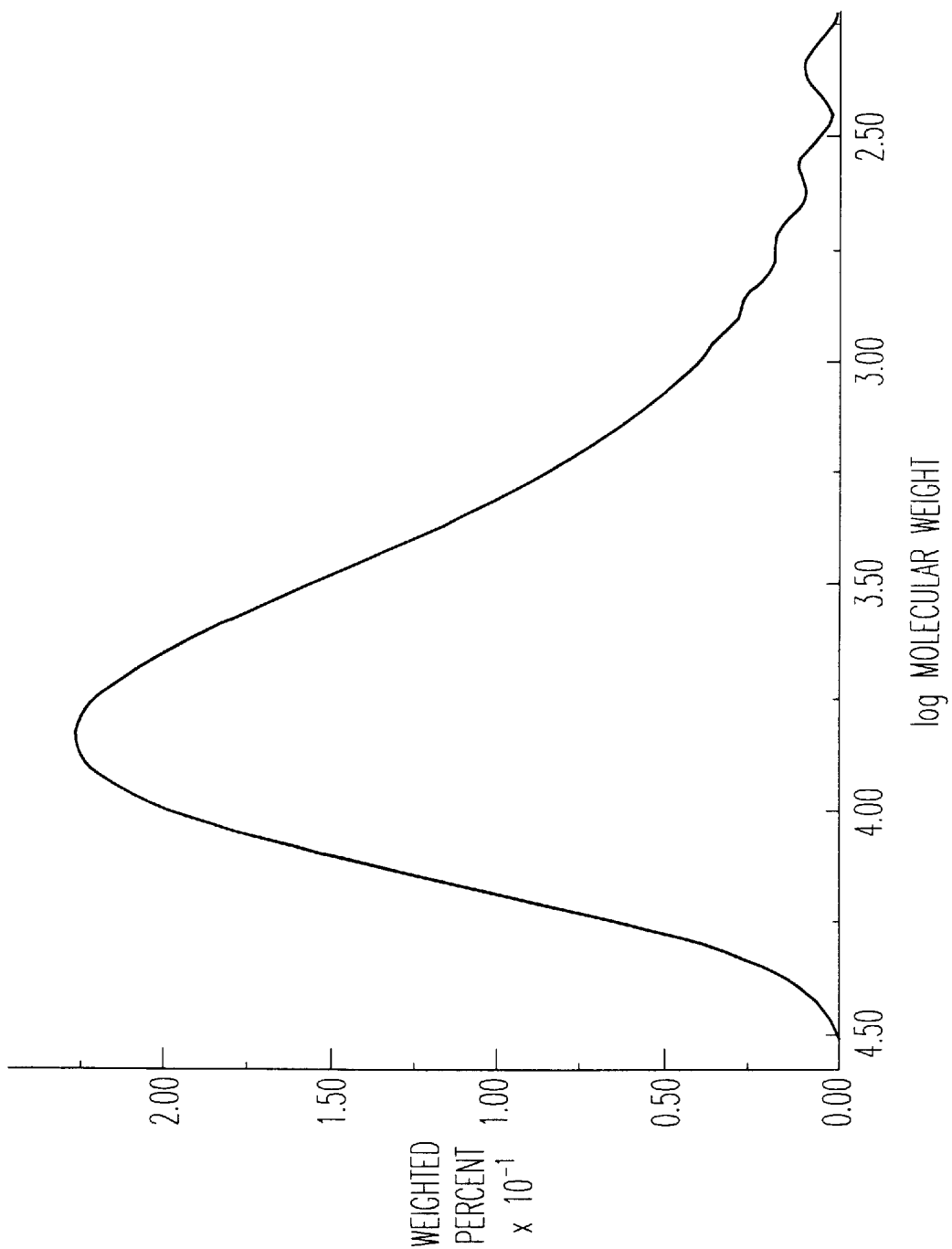

Id, corresponding to the formula:

is obtained quantitatively and corresponds to the following characteristics:

| | |
|---|---|
| physical state | liquid |
| colour | light yellow |
| primary alcohols/secondary alcohols (from C$^{13}$ nmr spectroscopy): [molar ratio] | 2.2 |
| N°$_{acid}$ (mg KOH/g) | 0.07 |
| viscosity Cps, | |
| +25° C. | 14700 |
| +75° C. | 670 |
| gpc (FIG. 3); | |
| Mn | 2898 |
| Mw | 6317 |
| Mn/Mw | 2.18 |
| pH | 6.3 |
| tg (DSC; C.°) | −48.7 |
| density (g/ml) | 1.126 |
| solubility in water (wt %) | 1.5 |
| ε-caprolactone (vpc) (wt %) | 0.07 |

Comparisons Relating to Examples 1–5

The following table enables a comparison to be made between the polyetherpolycarbonate copolyesters of the present invention (structures Ia–Id) with polycarbonate and polyetherpolycarbonate diols and commercial polycaprolactone in relation to some of their physical properties; the physical properties refer to polyols of PM (Mn) 2000:

| STRUCTURE | PHYSICAL STATE (mp, DSC) | VISCOSITY (Cps, ° C.) | Tg (° C.) DSC |
|---|---|---|---|
| HDCD | solid, mp52 | 2800 (+75°) | −50.0 |
| PCL | solid, mp50 | n.d. | n.d. |
| DEGCD | liquid | 300000 (25°) 3200 (75°) | −23.6 |
| BDCD | solid, mp60 | n.d. | −44.0 |
| TPGDEGCD | liquid | 70000 (25°) 1050 (75°) | −18.0 |
| Ia | liquid | 20000 (25°) | −50.0 |
| Ib | liquid | 20700 (25°) | −59.3 |
| Ic | liquid | 17000 (25°) | −65.0 |
| Id | liquid | 30000 (25°) | −48.7 |

EXAMPLE 6

Preparation of Diethyleneglycolpolycarbonate Co Polyvaerolactone Diol (Ie)

The DEG CD of example 1, (g 102.8) and glycidol (0.1 g) are charged into an 0.5 liter flask similar to that described in example 1.

The contents of the flask are brought to +130° C. and 83 g of δ valero lactone are added dropwise through a drip funnel maintaining a vigorous stirring.

At the end of the addition, the internal temperature is brought to 150° C. and maintained for 6 hours.

The temperature of the bath is lowered to 115–120° C. and a vacuum (0.01 torr) is applied to the flask by intermittently using a stream of dry nitrogen to remove the non-reacted caprolactone.

Figure 4:
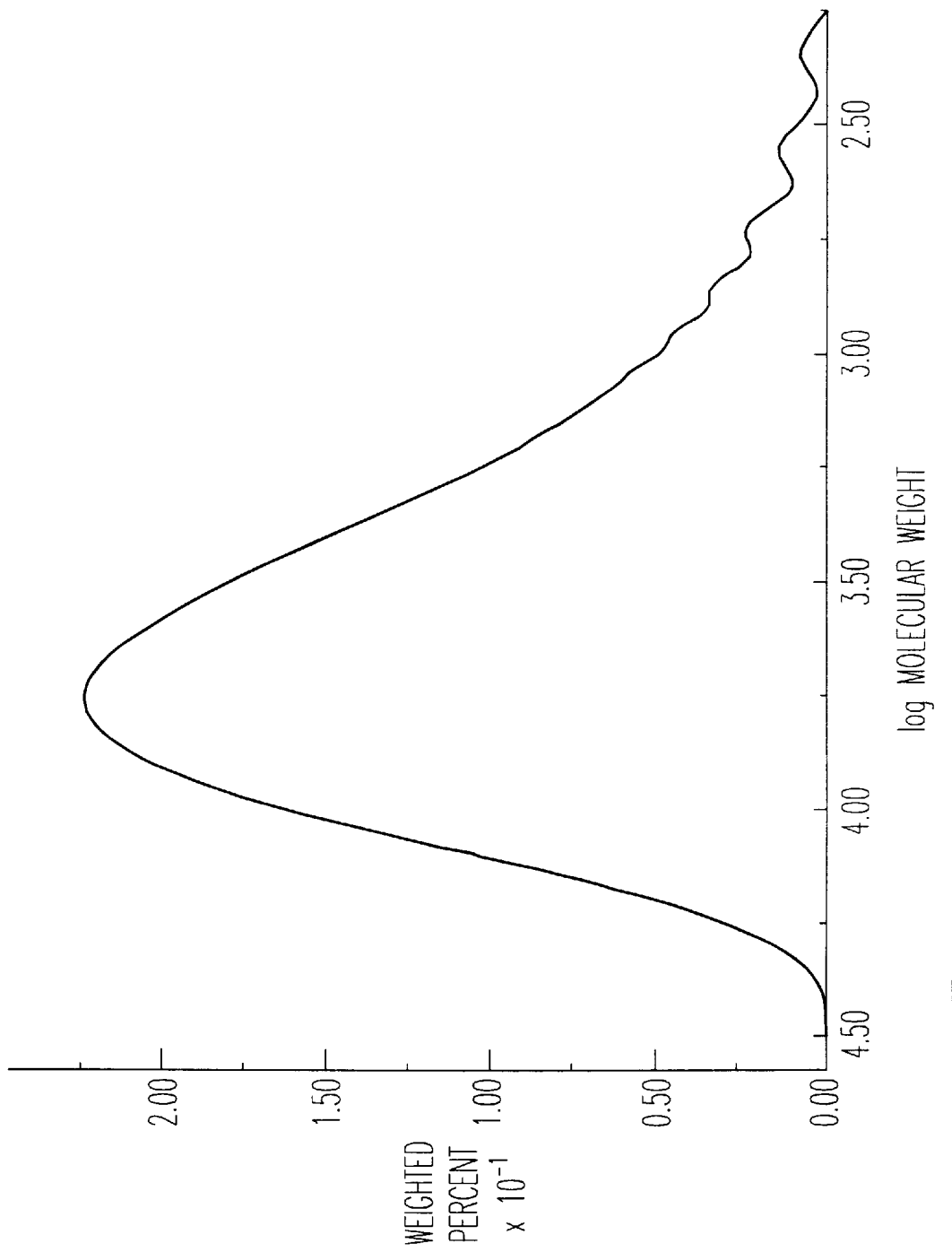

After 2 hours, 3.8 g of δ valerolactone are recovered. The valerolactone still present in the polyol amounts to 0.1%. The conversion of the valerolactone is 95.5% and the yield to Ie is 98%. Ie is normally represented by the structure:

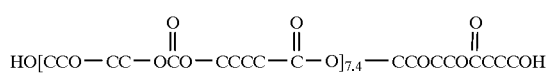

and has the following characteristics:

| physical state | liquid |
|---|---|
| colour | light yellow |
| N°$_{acid}$ (mg KOH/g) | 0.2 |
| N°$_{OH}$ | 58.6 |
| tg DSC; C.° | −44.0 |
| GPC (FIG. 4): | |
| Mn | 2523 |
| Mw | 5340 |
| Mw/Mn | 2.17 |

EXAMPLE 7

Preparation of Polydiethyleneglycolcarbonate Co Polylactide Diol (Mn 2000) (If)

DEG CD (g 85), glycidol (g 0.1) and L-lact (g 95) are reacted at 135° C. for an hour in the presence of SuDBL (3 mg) and TABDE (3 mg). The reaction is continued at +140° C. for three hours.

The contents of the flask are then brought to +100/105° C. and stripping is carried out under vacuum as described in example 6.

Figure 5:
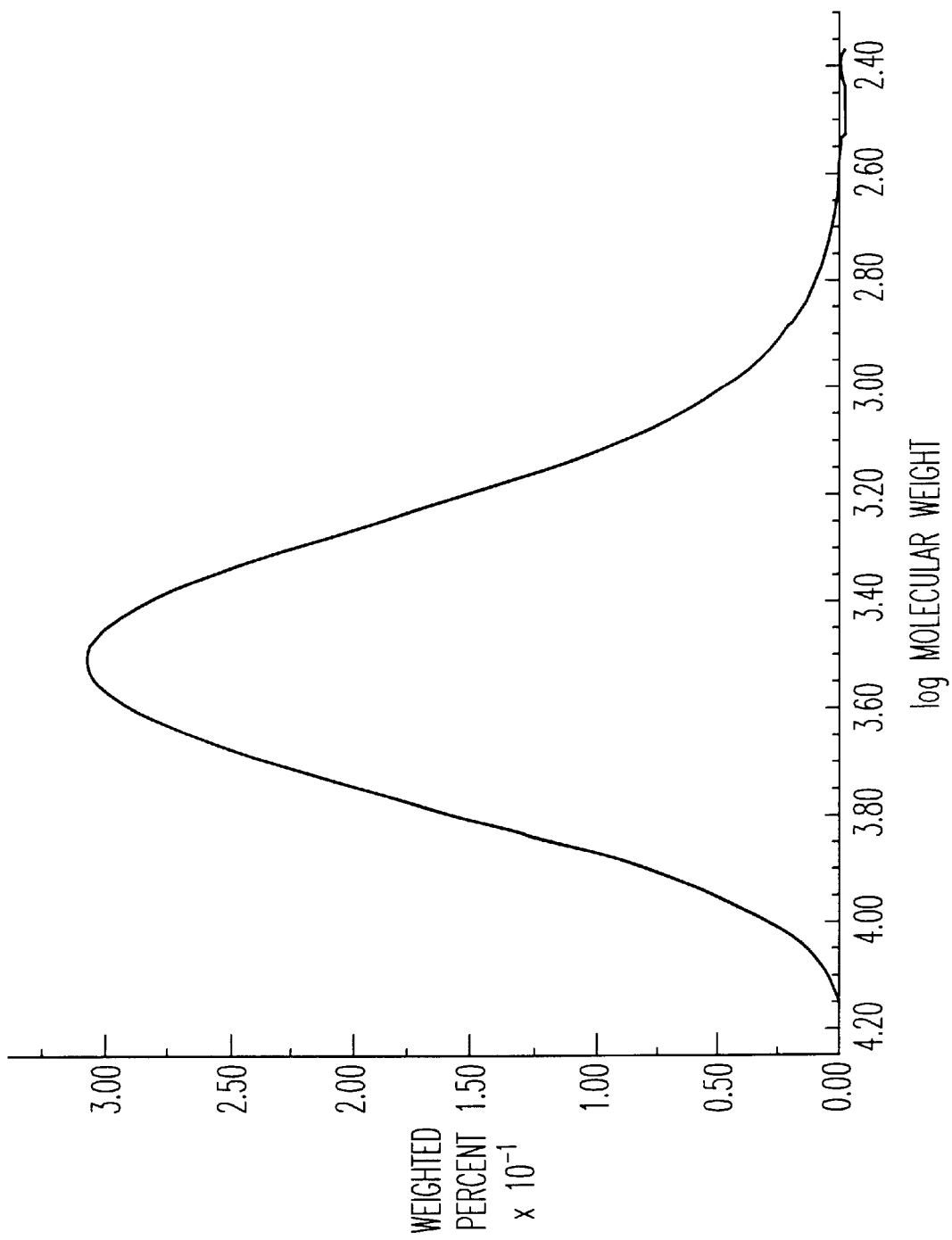

The conversion of the L Lact is 94%, that of If 96.8% and corresponds to the structure:

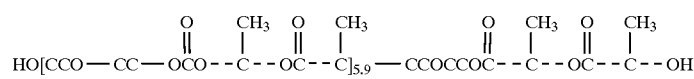

and has the following characteristics:

| physical state | vitreous solid |
|---|---|
| N°$_{acid}$ (mg KOH/g) | 0.3 |
| N°$_{OH}$ | 59.56 |
| GPC (FIG. 5): | |
| Mn | 2493 |
| Mw | 3254 |
| Mw/Mn | 1.31 |
| tg (DSC, C.°) | −0.4 |

EXAMPLES 8–12

Preparation of Polyurethane Thermoelastomers Using the Polyether Polycarbonate Diols Obtained in Examples 1, 2, 3, 5 and 6

Polyurethane thermoelastomers are prepared in dimethylformamide (35% of solids) starting from MDI, BD and polyether polycarbonate diols obtained in examples 1, 2, 3, 5 and 6.

The polyurethanes are prepared at a ratio NCO/OH=1.03 molar and with a final content of —NH—COO-groups of 15% by weight.

Films having a thickness of 0.2–0.3 mm are obtaind from the solutions in DMF by evaporation of the solvent in an oven at +65° C.

The films were evaluated as indicated in the legenda by Tg measurements, solvent absorption tests (gas oil, jet fuel 2) and by tensile tests (INSTRON); the latter were also carried out after both thermal and hydrolytic aging cycles.

The results of the tests relating to the six samples are summarized in table 1; for comparative purposes, table 2 indicates the corresponding results obtained from some polycarbonate and polyether polycarbonate diols with Mn 2000 and from a polyether diol of the commercial type (EP 530).

A comparison of tables 1 and 2 allows the following conclusions to be drawn:
i) the TPU obtained from the products of the present invention have satisfactory elastic properties regardless of the type of structure of the polycarbonate or polyether carbonate diol used in the syntheses; slightly poorer qualities are obtained from the polyethercarbonate copolyether diol of example 5, which prevalently has chain-ends of the secondary alcohol type;

ii) the tg is considerably lowered by the use of polyether carbonate copolyether diols compared with that of the TPU obtained from the polyether carbonate diol of example 1 and is more or less the same as that observed in the TPU from polyhexamethylenecarbonatediol (HDCD) or the normal commercial polyether diols;

iii) the oil resistance (gas oil and jet fuel) is improved with respect to all the control samples with the exception of that of the TPU produced with polyethyleneglycol carbonate diol (example 1 of table 2).

Owing to the polyester structure the polyether polycarbonate and polycarbonate copolyesters whose preparation is described herein, give thermoelastomers with a poor resistance to hydrolysis without stabilizers but a satisfactory thermal resistance.

Reasonable thermal resistance and hydrolytic resistance are contemporaneously present in the TPU obtained from the polyesterpolyether polycarbonate diol from example 5.

The results of thermo-oxidative and hydrolytic resistance up to 60 days of aging for the hydrolytic test (85° C., immersion in water) and thermo-oxidative test (+120° C., oven and air) are summarized in table 3 and refer to the TPU prepared starting from polycarbonate and polyether polycarbonate copolyester diols of examples 1, 2, 3, 5 and 6; it is expressed as retention % of the initial tensile properties of the TPU under maximum stress, maximum elongation and secant module at 100% elongation.

EXAMPLE 13

Preparation of Norbornenedimethanol, 1,6 Hexandiol Polycarbonate Co Polycaprolactone Diol (Ig)

A polycarbonate diol is prepared from norbornene dimethanol (moles 1.165; g 180), hexandiol 1,6 (g 820; moles 6.939) and DMC (g 838.4; moles 9.30).

The product has the following characteristics:

| | |
|---|---|
| $N°_{OH}$ | 107.25 |
| Mn | 1046 |

Ti content (ppm 18) and is normally represented by the formula:

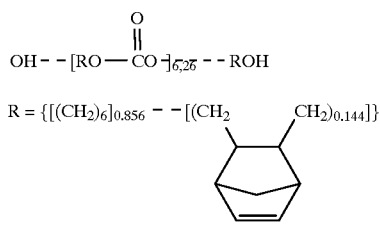

wherein and more than 95% of the unsaturations is represented by norbornene structures on the basis of the formula indicated.

This polycarbonate diol (700 g; OH functionality >99.5% of the theoretical value) is placed in a flask of the type used in example 1 and ε caprolactone (g 558, moles: 4.89) is fed in approximately one hour at +150° C. and under stirring.

At the end of the addition the temperature is raised to +170° C. and maintained at this value for 2 hours (no addition of catalysts apart from that used for the synthesis of the polycarbonate diol used as precursor).

At the end of the two hours the content of ε CL in the resulting polycarbonate copolycaprolactone diol is <0.15 weight % (Vpc analysis) (Ig).

The reaction is therefore interrupted and Ig is characterized:

| | |
|---|---|
| $N°_{OH}$ | 60.15 |
| $N°_{acid}$ (mg KOH/g) | 0.06 |
| Mn | 1865 |
| viscosity (cps) | |
| 25° C. | 16800 |
| 75° C. | 1080 |
| norbornene unsaturations (meq/g) | 0.56 |
| tg (° C.) | −61.3 |
| tm (° C.) | +7.8 |
| tc (° C.) | −28.4 | and is normally represented by the structure:

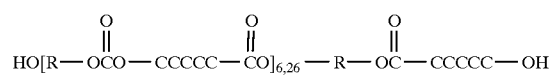

wherein R has the meaning defined above.

TABLE 1

| Soft phase | | Oil absorption (1) (% w/w) | | Tensile properties (2) | | |
|---|---|---|---|---|---|---|
| (a) from ex. Nr (Mn 2000) | Tg (°C.) | gas oil | Jet Fuel 2 | Maximum stress N/mm² | Elongation corresponding to max. stress (%) | Secant module corresponding to 100% elong. (N/mm²) |
| 1 | −32.7 | 2.8 | 8.2 | 69.4 | 1625 | 7.1 |
| 2 | −33 | 5.5 | 13.1 | 64.0 | 1463 | 9.34 |
| 3 | −35 | 7.0 | 17.7 | 67.5 | 1262 | 8.47 |
| 5 | −22 | 3.5 | 10.0 | 45.1 | 1745 | 7.22 |
| 6 | −31 | 2.0 | 8.5 | 55.4 | 1530 | 8.93 |

(1) ASTM
(2) ASTM

TABLE 2

| Soft phase (Mn 2000) | Tg (°C.) | Oil absorption (% w/w) | | Tensile properties | | |
|---|---|---|---|---|---|---|
| | | gas oil | Jet Fuel (2) | Maximum stress N/mm$^2$ | Elongation corresponding to max. stress (%) | Secant module corresponding to 100% elong. (N/mm$^2$) |
| Control 1 | −31 | 6.3 | 17.7 | 71.4 | 1145 | 8.2 |
| Control 2 | −1 | 1.0 | 4.3 | 65.5 | 1530 | 11.3 |
| Control 3 | −43 | 9.3 | 20.5 | 61.8 | 1375 | 7.7 |
| Control 4 | −32 | 13.2 | 26 | 51.5 | 1698 | 7.0 |

Control 1 HDCD (polycarbonate diol from hexandiol 1,6)
Control 2 DEGCD (polycarbonate diol from diethyleneglycol)
Control 3 PTMEG 250 CD (polycarbonate diol from polytetrahydrofurandiol)
Control 4 EP 530 Ethyleneglycolbis propyleneglycol b ethylene glycolether

TABLE 3

| TPU from PC-RESCD as in Ex. Nr. | Hydrolysis test (a) | | | 60 days aging | | |
|---|---|---|---|---|---|---|
| | | | | Resistance test thermo-oxidation (b) retention (%) | | |
| | retention (%) | | | | | |
| | Maximum stress (%) | Secant Module (%) | Maximum elongation (%) | Maximum stress (%) | Secant Module (%) | Maximum elongation (%) |
| 1 | decayed | | | 74 | 104 | 118 |
| 2 | decayed | | | 88 | 98 | 102 |
| 3 | decayed | | | 89 | 105 | 113 |
| 5 | 63 | 103 | 64 | 63 | 108 | 87 |
| 6 | decayed | | | 78 | 107 | 104 |

(1) test at +85° C., immersion in water
(2) test at +120° C.

We claim:

1. A process for the preparation of polycarbonate copolyester diols having a number average molecular weight of 1000–6000 having the following formula:

$$HO--[-(R_1OCO)_{\overline{m}}--(R_2CO)_{\overline{n}}-]--R_1--OH \quad (I)$$

wherein the polycarbonate or polyether carbonate diol unit has the formula:

$$-(R_1-OCO)_{\overline{m}}-$$

which represents an amount ranging from 30–70% by weight of the whole polycarbonate or polyethercarbonate co-polyester diol, and wherein R$_1$ is a divalent organic radical derived from one or more polyether glycols or aliphatic glycols containing from 4–20 carbon atoms;

R$_2$ is a divalent organic radical which corresponds to a cyclic lactone having a ring of 4, 6 or 7 atoms or an organic residue derived from a lactide or glycolactide; and n and m, being the same or different, have a value ranging from 2–40; comprising:

reacting a cyclic ester having the formula:

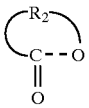
(II)

wherein R$_2$ has the meaning defined above, with a polyether carbonate or polycarbonate diol having the formula:

$$O-(R_1OCO)_m-R_1-OH \quad (II)$$

wherein R$_1$ and m have the same meaning defined above, at a temperature ranging from 100–180° C. and for a time ranging from 2–10 hours.

2. The process according to claim 1, wherein the compound of formula I is prepared by reacting, over a time of 1–4 hours, the compounds of formulas II and III at a temperature ranging from 120–170° C.

3. The process according to claim 1, wherein R$_1$ represents at least one radical selected from the group consisting of:

$$-(CH_2)_4-; \quad -(CH_2)_5-;$$

$$-(CH_2)_2-\overset{CH_3}{CH}-(CH_2)_2-; \quad -(CH_2)_8-;$$

$$-(CH_2)_9-; \quad -CH_2-\overset{CH_3}{CH}-(CH_2)_7-;$$

$$-(CH_2)_{10}-; \quad -(CH_2)_{12}-;$$

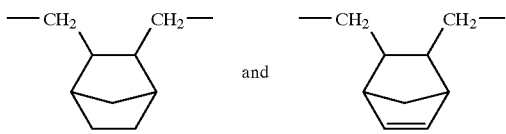

and

4. The process according to claim 1, wherein R$_1$ is at least one radical selected from the group consisting of:

—(CH$_2$—CH$_2$O)$_{1-9}$ --CH$_2$—CH$_2$—

—(CH$_2$—CH$_2$O)$_{1-5}$--(CH$_2$—CH(CH$_3$)O)$_{1-6}$—CH$_2$—CH(CH$_3$)—;

—(CH$_2$—CH$_2$—CH$_2$—CH$_2$O)$_{1-4}$CH$_2$—C$_2$—CH$_2$—CH$_2$—;

—(CH$_2$—CH$_2$—CH$_2$—CH$_2$—O)$_{1-4}$(CH$_2$—CH$_2$—O)—CH$_2$—CH$_2$—;

—(CH(CH$_3$)—CH$_2$—O)$_{1-5}$—CH$_2$—CH(CH$_3$)—

5. The process according to claim 1, wherein R$_2$ is at least one divalent organic radical selected from the group consisting of:

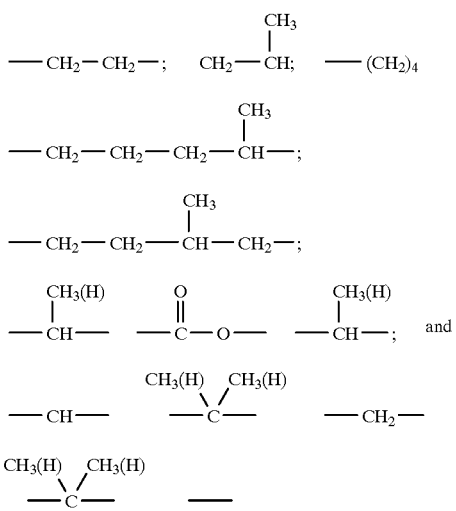

and

6. The process according to claim 1, wherein R$_1$ is a divalent organic radical or a combination of radicals selected from the group consisting of:

—(CH$_2$)$_4$—; —(CH$_2$)$_5$—; —(CH$_2$)$_6$;

n=m and

R$_2$ is a divalent 1,5-pentylene radical.

7. The process according to claim 1, wherein the reaction is conducted in the presence of an organometallic or a tertiary amine catalyst having a pKb>12.

8. The process according to claim 7, wherein said organometallic catalyst is a di- or tetravalent tin compound, and said tertiary amine is a cyclic amine.

9. The process of claim 8, wherein said organotin compound is tin dibutyldilaurate or tin octoate and said amine is 1,4-diazabicyclo[2,2,2]octane or 1,5,7-triazabicyclo [4,4,0] dec-5-ene.

10. A polycarponate copolyester diol prepared by the process of claim 1 having a number average molecular weight ranging from 1000–3000.

11. A polycarbonate copolyester diol prepared by the process of claim 1 having the formula (Ia):

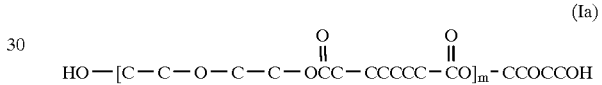

(Ia)

wherein m is as defined above.

12. A polycarbonate copolyester diol having the formula:

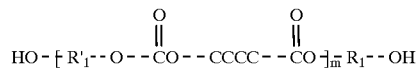

wherein R'$_1$ is —(CH$_2$)$_4$—; —(CH$_2$)$_5$—; —(CH$_2$)$_6$—; and n is as defined above, the compound prepared by the process of claim 1.

13. A process of preparing polyurethane end-products, thermoelastomers, paints and adhesives, comprising:
  incorporating the polycarbonate copolyester diol prepared by the process of claim 1 as an additive in each of the polyurethane end-products, thermoelastomers, paints and adhesives.

* * * * *